(No Model.)

G. F. RICHARDSON.
Pendulum Scale.

No. 236,261. Patented Jan. 4, 1881.

Witnesses:
Williamson Burr
J. M. Kalb

Inventor:
George F. Richardson
per Edw. W. Donn
atty.

UNITED STATES PATENT OFFICE.

GEORGE F. RICHARDSON, OF MONTAGUE, MASSACHUSETTS, ASSIGNOR TO GEORGE A. CLAPP AND JAMES H. CLAPP, OF SAME PLACE.

PENDULUM-SCALE.

SPECIFICATION forming part of Letters Patent No. 236,261, dated January 4, 1881.

Application filed July 19, 1880. (No model.)

*To all whom it may concern:*

Be it known that I, GEORGE F. RICHARDSON, of Montague, in the county of Franklin and Commonwealth of Massachusetts, have invented a new and useful Improvement in Scales for Weighing, of which the following is a true and full specification.

My invention relates to that class of scales commonly in use for weighing small articles in domestic and in commercial use, and is of the class commonly called "pendulum-scales."

Figure 1:
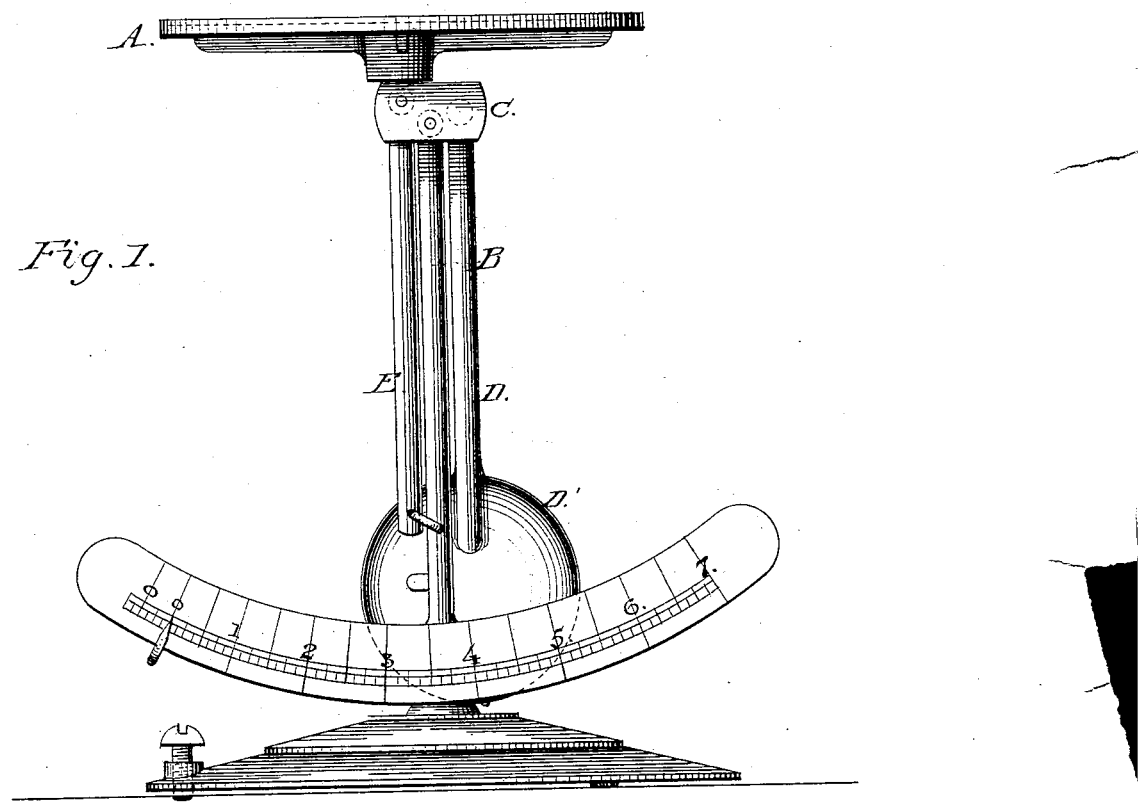
Figure 2:
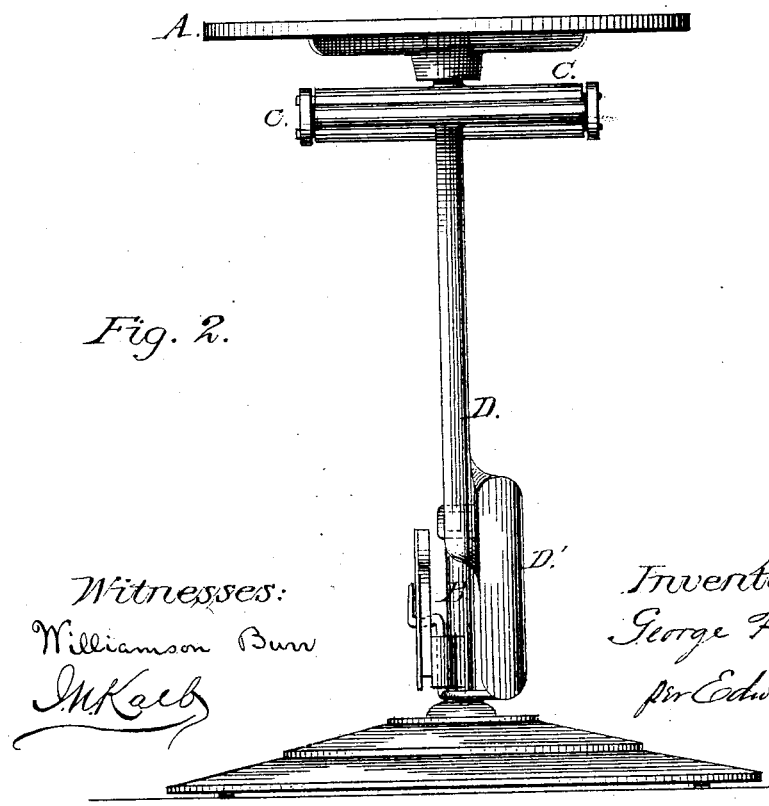

In the drawings, Figure 1 is a front elevation of the device. Fig. 2 is a side elevation of the same.

In the drawings, A represents the platform or table on which the article to be weighed is placed.

B is the standard supporting the working parts of the scale, secured at the bottom in a base which rests on three points, one of which is an adjustable screw to readily make a level bearing. This standard has on its upper end a cross-head, which sustains a yoke, C, which is made of two end pieces and a cross-bar connecting them. To this cross-bar is attached the pendulum-rod D, having its lower end properly weighted. The yoke C is sustained on the standard by steel pivots passing through the ends of the yoke and fastened in the ends of the cross-head.

E is a movable post, upon which rests the platform A. A little below the upper end of this is a cross-bar loosely secured between the ends of the yoke by steel pivots passing through the end pieces of the yoke into the ends of the cross-bar. The post E extends down parallel with and nearly the length of the standard B, to which it is secured at the bottom by a link, which allows it to move up and down with the varying weight on its top. On the standard B, near its bottom, is a stop, against which the post E strikes when the scale is loaded to its utmost capacity.

At the bottom of the standard B is attached a segment of a circle of the radius of the pendulum. This segment is graduated for registering the division of weights, as pounds, halves, quarters, and ounces. At the lower end of the pendulum D' is secured a wire as long as half of the graduated segment. This is bent around and turned up with a sharp point in front of the segment, to indicate the pounds or ounces as the pendulum is swung out by the weight placed on platform A.

The pivots which pass through the end pieces of the yoke into the ends of the cross-bars on both the standard B and the movable post E are made of hardened steel, and driven or screwed into the cross-heads, where they are firm. To insure the least possible friction, these are very small, and the holes through which they pass in the ends of the yoke are countersunk from the outside to the inner face, thus forming a thin, delicate bearing, as sensitive as a "knife-edge," and much cheaper and easier inserted.

The operation of the parts of the scale is as follows: After it is properly adjusted, a weight placed upon the platform A bears upon the cross-bar of the movable post E, which is secured in the ends of the yoke, and, acting as a lever, with the pins in the cross-bar of the standard B as a fulcrum, raises the opposite side of the yoke, to which is attached the pendulum D'. The wire pointer fastened to the pendulum is thus moved forward, indicating on the segment the exact amount of weight on the platform A.

I am aware that scales have been used with segmental registers and with pendulum-balance; but I believe mine to be simpler, cheaper, and more compact—with equal precision—than any others in use; and, therefore,

I claim—

As an improved article of manufacture, the weighing-scale having a standard, B, provided with arms at its upper end, forming a T, which serves as fulcrum-supports to a yoke, C, having a pendulum, D D', forming a part of it, on one side, and a post, E, provided with arms, and a platform pivoted to said yoke, on the opposite side, said pendulum being provided at its weighted end with a wire extension, forming a pointer, to indicate upon a graduated scale attached to the base of the standard the quantity weighed.

GEO. F. RICHARDSON.

Witnesses:
JAMES S. GRINNELL,
WM. H. ALLEN.